3,157,631
AZO VAT DYES

Hans Weidinger, Limburgerhof, Pfalz, and Hans Gottfried Haese, Ludwigshafen (Rhine), Germany, assignors to Badische Anilin- & Soda-Fabrik Aktiengesellschaft, Ludwigshafen (Rhine), Germany
No Drawing. Filed July 2, 1963, Ser. No. 292,457
Claims priority, application Germany July 6, 1962
4 Claims. (Cl. 260—154)

This invention relates to new vat dyes having the general Formula I:

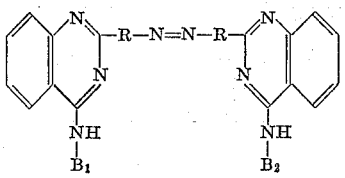

where R is selected from the group consisting of 1,4-phenylene, 1,3-phenylene and 4,4'-diphenylene and $B_1$ and $B_2$ are selected from the group consisting of anthraquinonyl-(1),
anthraquinonyl-(2),
3-chloranthraquinonyl-(1),
4-benzoylanthraquinonyl-(1),
5-benzoylanthraquinonyl-(1),
1-amino-2-acetyl-antraquinonyl-(4),
anthraquinon(1(N)-2-benzacridone)-yl-(4),
1'-chloro-anthraquinone-1(N)-2-benzacridonyl-(4'),
1-amino-2-[2-phenyloxdiazolyl-(5)]-anthraquinonyl-(4),
1-amino-2-[(2-phenylene)-oxdiazolyl-(5)]-anthraquinone,
anthrapyrimidinyl-(4), and
anthrapyrimidinyl-(5), and also to a process for the production of the said dyes.

These new dyes are valuable vat dyes with which cotton can be dyed bright shades having good color strength and good fastness properties.

Compounds in which R in the general Formula I denotes a 1,4-phenylene radical or a 4,4'-diphenylene radical are of special interest among the new dyes.

The new dyes according to this invention may be obtained by bilateral condensation of a quinazoline chloride having the general Formula II:

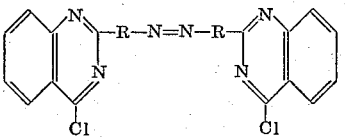

in which R denotes a 1,4-phenylene radical, a 1,3-phenylene radical or a 4,4'-diphenylene radical, in an organic solvent which does not react under the reaction conditions, with one or two vattable amines at a temperature of from 100° to 200° C.

The quinazoline chlorides to be used as initial materials for the new process are new compounds. They may be prepared for example by acylating anthranilamide with 3-nitrobenzoyl chloride, 4-nitrobenzoyl chloride or 4-nitrodiphenyl-4'-carboxylic chloride, cyclising the resulting acylaminobenzamides with alkali to form the corresponding hydroxyquinazolines, converting the latter with alkaline glucose solution into the azo compounds and finally exchanging the hydroxyl groups in the azo compounds for chlorine atoms by means of phosgene.

Examples of vattable amines are anthraquinones substituted in position 1 or 2 with an amino group and if desired containing further substituents such as halogen, amino, acylamino, acyl and/or hydroxyl groups. While the anthraquinone skeleton has three condensed rings there can also be used as aminoanthraquinones those which have further condensed rings, e.g., aminobenzacridones or aminoanthrapyrimidine. The said compounds having 4, 5 or more condensed rings may also contain further substituents in addition to the amino groups. For illustration only and not for limitation there may be mentioned:

1-aminoanthraquinone,
2-aminoanthraquinone,
1-amino-3-chloroanthraquinone,
1-amino-4-benzoylaminoanthraquinone,
1-amino-5-benzoylaminoanthraquinone,
1,4-diamino-2-acetylanthraquinone,
4-aminoanthraquinone-1(N)-2-benzacridone,
1'-chloro-4'-aminoanthraquinone-1(N)-2-benzacridone,
1,4-diamino-2-[2-phenyloxadiazolyl-(5)]-anthraquinone,
1-amino-2-[2-(2-aminophenyl)-oxadiazolyl-(5)]-anthraquinone,
4-aminoanthrapyrimidine, and
5-aminoanthrapyrimidine.

Examples of organic solvents which do not react under the reaction conditions are: o-dichlorobenzene, trichlorobenzene or nitrobenzene.

The reaction is carried out so that the two chlorine atoms are replaced either by the same vattable amine or by two vattable amines which are different from each other. It is advantageous to start from about stoichiometric amounts of the initial materials and to proceed for example by heating to the reaction temperature 1 mole of the quinazoline chloride with 2 moles of the vattable amine to be used or with a mixture of 1 mole each of two vattable amines in an organic solvent which does not react under the reaction conditions, for example nitrobenzene. The new vat dyes give full dyeings or prints having good fastness properties on cotton, regenerated cellulose and polyamides.

Very fast and bright dyeings of good color strength are obtained with the new vat dyes particularly on cellulose.

The invention is illustrated by the following examples in which parts are by weight unless otherwise specified. Parts by weight bear the same relation to parts by volume as the kilogram to the liter (S.T.P.).

EXAMPLE 1

A mixture of 9 parts of 4,4'-di-[4-chloroquinazolyl-(2)]-azobenzene, 8.1 parts of 2-aminoanthraquinone (97.8%) and 120 to 150 parts of nitrobenzene is heated at 190° C. for three hours. The reaction mixture is cooled and the deposited product is filtered off, washed with methanol and dried. A dye is obtained which dyes cotton fast yellow shades from a wine red vat.

Dyes having a similar constitution are obtained by using the amounts of other vattable amines set out in the following Table 1 instead of 8.1 parts of 2-aminoanthraquinone and otherwise proceeding as described in the preceding paragraph.

Table 1

| Example No. | Parts of vattable amine | Shade of dye | |
|---|---|---|---|
| | | In the vat | On cotton cloth |
| 2 | 9.1 1-amino-3-chloranthraquinone. | Wine red | Golden orange. |
| 3 | 7.9 1-aminoanthraquinone | Red brown | Orange. |
| 4 | 12.1 1-amino-5-benzoyl-amino-anthraquinone. | do | Brown orange. |
| 5 | 8.7 5-aminoanthrapyrimidine. | do | Brown. |
| 6 | 13.5 1-amino-2-[2-(2-aminophenyl)-oxadiazoyl-(5)]-anthraquinone. | do | Red. |
| 7 | 12.1 1-amino-4-benzoyl-amino-anthraquinone. | do | Claret. |
| 8 | 13.5 1,4-diamino-2-[2-phenyl-oxadiazoyl-(5)]-anthraquinone. | Violet | Blue-green. |
| 9 | 9.8 1,4-diamino-2-acetyl-anthraquinone. | Dark blue | Do. |
| 10 | 12.0 4-aminoanthraquinone-1(N), 2-benzacridone. | Violet | Green. |
| 11 | 13.3 1'-chloro-4'-amino-anthraquinone-1(N)-2-benzacridone. | do | Grey. |

4,4'-di-[4-chloroquinazolyl-(2)]-azobenzene used as initial material in Examples 1 to 11 may be obtained for example in the following way.

A solution of 136 parts of 4-nitrobenzoyl chloride in 140 parts by volume of benzene is allowed to drip gradually at 20° to 30° C. into a suspension of 100 parts of anthranilamide in 700 parts by volume of 2 N sodium carbonate solution. The reaction mixture is stirred for another three hours at 20° to 30° C. The benzene is then distilled off from the mixture. 1000 parts by volume of 2 N sodium hydroxide solution is added and the mixture is heated for one hour at 95° C., solution thus taking place. After the reaction mixture has been cooled, 175 parts by volume of concentrated hydrochloric acid ($d=1.15$) is added, the deposited product is filtered off, washed with water until neutral and dried. 178 to 185 parts of 2-(4-nitrophenyl)-4-hydroxyquinazoline is obtained as a light yellow crystal powder having a melting point of 352° to 354° C.

133.5 parts of the 2-(4-nitrophenyl)-4-hydroxyquinazoline is stirred into a solution of 50 parts of potassium hydroxide in 2000 parts of water. A solution of 300 parts of sodium hydroxide in 1625 parts of water is added to this mixture and the solution is heated to 85° C. 100 parts of glucose is introduced, the mixture is stirred for thirty minutes at 90° to 95° C., a further 50 parts of glucose is added and the mixture is stirred for another hour at 90° to 95° C. The mixture is cooled and the precipitated product is filtered off with suction, the filter residue washed with about 2 N caustic soda solution and then stirred into about 2000 parts of water. Such an amount of hydrochloric acid is added to the aqueous suspension that the mixture still has an acid reaction after stirring for half an hour. The deposited product is filtered off with suction, washed with water until free from acid and dried.

108 to 110 parts of 4,4'-di-[4-hydroxyquinazolyl-(2)]-azobenzene is obtained as an orange crystal powder which does not melt at up to 350° C.

Phosgene is passed into a mixture of 20 parts of 4,4'-di-[4-hydroxyquinazolyl-(2)]-azobenzene and 120 parts of nitrobenzene for five hours at 180° C. The reaction mixture is allowed to cool and air is blown through for some hours to remove the excess phosgene. The product is filtered off with suction, washed with a little nitrobenzene and then with benzene and dried at 50° C. under subatmospheric pressure. 18 to 20 parts of 4,4'-di-[chloroquinazolyl-(2)]-azobenzene is obtained as small orange yellow crystal needles which do not melt up to 350° C.

EXAMPLE 12

A mixture of 9 parts of 3,3'-di-[4-chloroquinazolyl-(2)]-azobenzene, 7.9 parts of 1-aminoanthraquinone and 120 to 150 parts of nitrobenzene is heated at 190° C. for three hours. After the reaction mixture has been cooled, the deposited product is filtered off, washed with methanol and dried. A dye is obtained which dyes cotton fast orange shades from a wine red vat.

Dyes having similar constitution are obtained by using the amount of other amines specified in Table 2 instead of 7.9 parts of 1-aminoanthraquinone and otherwise following the procedure of the preceding paragraph.

Table 2

| Example No. | Parts of vattable amine | Shade of dye | |
|---|---|---|---|
| | | In the vat | On cotton cloth |
| 13 | 8.1 2-aminoanthraquinone | Dark red | Yellow. |
| 14 | 12.1 1-amino-5-benzoyla-mino-anthraquinone. | Wine red | Brown orange. |
| 15 | 13.5 1-amino-2-[2-(2-aminophenyl)-oxadiazoyl-(5)]-anthraquinone. | do | Red. |
| 16 | 12.1 1-amino-4-benzoyla-mino-anthraquinone. | do | Red violet. |
| 17 | 13.5 1-4-diamino-2-[2-phenyloxadiazoyl-(5)]-anthraquinone. | Violet | Blue. |
| 18 | 12.0 4-aminoanthraquinone-1-(N),2-benzacridone. | do | Blue green. |
| 19 | 13.3 1'-chloro-4'-aminoanthraquinone-1(N),2-benzacridone. | do | Blue grey. |

The 3,3'-di-[4-chloroquinazolyl-(2)]-azobenzene used as initial material in Examples 12 to 19 may be obtained for example as follows:

Anthranilamide is acylated with 3-nitrobenzoyl chloride in the way already described for the production of 4,4'-di-[4-chloroquinazolyl-(2)]-azobenzene and the acylaminobenzamide formed is cyclized with sodium hydroxide solution to form the hydroxyquinazoline. 176 to 183 parts of 2-(3-nitrophenyl)-4-hydroxyquinazoline is obtained as a pale yellow crystal powder having a melting point of 340° to 342° C.

133.5 parts of 2-(3-nitrophenyl)-4-hydroxyquinazoline is reduced to the azo compound with alkaline glucose solution as already described for the isomeric 2-(4-nitrophenyl)-4-hydroxyquinazoline. 102 to 105 parts of 3,3'-di-[4-hydroxyquinazolyl-(2)]-azobenzene is obtained as an orange crystal powder which does not melt up to 350° C.

Phosgene is passed for seven hours at 180° C. into a mixture of 60 parts of 3,3'-di-[4-hydroxyquinazolyl-(2)]-azobenzene and 550 parts of nitrobenzene. The reaction mixture is allowed to cool and air is blown therethrough for some hours to remove excess phosgene. The product is filtered off with suction, washed with a little nitrobenzene and then with benzene and dried at 50° C. under subatmospheric pressure. 63 to 64 parts of 3,3'-di-[4-chloroquinazolyl-(2)]-azobenzene is obtained as an orange yellow crystal powder which melts at from 300° to 310° C.

EXAMPLE 20

A mixture of 6.7 parts of 4,4'-di-[4-chloroquinazolyl-(2)]-azodiphenyl, 4.4 parts of 1-aminoanthraquinone and 120 to 150 parts of nitrobenzene is heated for three hours at 190° C. After the reaction mixture has cooled, the deposited product is filtered off, washed with methanol and dried. A dye is obtained which dyes cotton fast yellow shades from a red brown vat.

Dyes having a similar constitution are obtained by using the amounts of other vattable amines stated in Table 3 instead of 4.4 parts of 1-amino-anthraquinone and otherwise following the procedure described in the preceding paragraph.

Table 3

| Example No. | Parts of vattable amine | Shade of dye | |
|---|---|---|---|
| | | In the vat | On cotton cloth |
| 21 | 4.5 2-aminoanthraquinone (97.8). | Red brown | Yellow. |
| 22 | 6.8 1-amino-5-benzoyl-amino-anthraquinone. | do | Do. |
| 23 | 5.6 1,4-diamino-2-acetyl-anthraquinone. | Violet | Blue green. |
| 24 | 6.8 4-aminoanthraquinone-1(N),2-benzacridone. | do | Green. |

The 4,4'-di-[4-chloroquinazolyl-(2)]-azodiphenyl used as initial material in Examples 20 to 24 may be obtained for example as follows:

68 parts of anthranilamide is dissolved at room temperature in a mixture of 640 parts by volume of glacial acetic acid and 640 parts by volume of aqueous saturated sodium acetate solution. A suspension of 129.5 parts of 4'-nitrophenyl-4-carboxylic chloride in 450 parts by volume of acetone is gradually added and the reaction mixture is then stirred for another hour at room temperature. The deposited product is filtered off, washed with water and dried. 153 to 162 parts of 2-[4'-nitrophenyloyl-(4)-amino]-benzamide is obtained as a colorless crystal powder having a melting point of 245° to 250° C.

160 parts of 2-[4'-nitrodiphenyloyl-(4)-amino]-benzamide is introduced into a boiling mixture of 1800 parts by volume of 2 N sodium hydroxide solution and 80 parts by volume of pyridine. Any impurities present are filtered off and the solution is allowed to cool and acidified with glacial acetic acid. The deposited product is filtered off with suction, washed with water and dried. 131 to 150 parts of 2-[4'-nitrodiphenyl-(4)]-4-hydroxyquinazoline is obtained as a light yellow crystal powder having a melting point of 325° to 330° C.

85 parts of 2-[4'-nitrodiphenyl-(4)]-4-hydroxyquinazoline is stirred into a solution of 28 parts of potassium hydroxide in 1000 parts of water. 1500 parts by volume of 2 N sodium hydroxide solution is added to this mixture and the solution heated to 85° C. 50 parts of glucose is introduced and the mixture stirred for thirty minutes at 90° to 95° C. The reaction mixture is diluted with 250 parts by volume of 2 N sodium hydroxide solution and, after a further addition of 50 parts of glucose, the whole is stirred for another hour at 90° to 95° C. The reaction mixture is allowed to cool, the mother liquor filtered off with suction from the deposited product as completely as possible and the filter residue washed with a little 2 N sodium hydroxide solution. The filter cake is stirred into about 1500 parts of water and such an amount of hydrochloric acid is added that the mixture has a clearly acid reaction even after having been stirred for half an hour. The product is then filtered off, washed with water and dried. 4,4'-di-[4-hydroxyquinazolyl-(2)]-azodiphenyl is obtained as an orange yellow crystal powder which does not melt up to 350° C.

Phosgene is passed into a mixture of 113 parts of 4,4' - di - [4 - hydroxyquinazolyl - (2)] - azodiphenyl and 1000 parts of nitrobenzene for seven hours at 180° C. The reaction mixture is allowed to cool and air is passed therethrough for some hours to expel excess phosgene. The deposited product is filtered off, washed with a little nitrobenzene and then with benzene and dried under subatmospheric pressure. 85 parts of 4,4'-di-[4-chloroquinazolyl-(2)]-azodiphenyl is obtained as an orange yellow crystal powder having a melting point of 324° to 326° C.

EXAMPLE 25

A mixture of 18 parts of 4,4'-di-[4-chloroquinazolyl-(2)]-azobenzene, 7.9 parts of 1-aminoanthraquinone, 12.1 parts of 1-amino-5-benzoylaminoanthraquinone and 250 to 300 parts of nitrobenzene is heated for three hours at 190° C. After the reaction mixture has cooled, the deposited product is filtered off, washed with methanol and dried. A dye is obtained which dyes cotton orange shades from a red brown vat.

Dyes having similar constitutions are obtained by using the amounts of 7.9 parts of 1-aminoanthraquinone and/or 12.1 parts of 1-amino-5-benzoylaminoanthraquinone and otherwise following the procedure of the preceding paragraph.

Table 4

| Example No. | Parts of vattable amine | Shade of dye | |
|---|---|---|---|
| | | In the vat | On cotton cloth |
| 26 | 12.1 1-amino-5-benzoyl-amino-anthraquinone, 8.7 5-aminoantherapyrimidine. | Red brown | Brown. |
| 27 | 12.1 1-amino-5-benzoyl-amino-anthraquinone, 12.0 4-aminoanthraquinone-1(N),2-benzacridone. | Dark brown. | Olive. |
| 28 | 9.8 1,4-diamino-2-acetyl-anthraquinone, 12.0 4-aminoanthraquinone-1(N),2-benzacridone. | Violet | Blue-green. |
| 29 | 12.1 1-amino-5-benzoyl-amino-anthraquinone, 9.8 1,4-diamino-2-acetylanthraquinone. | Dark brown. | Olive. |
| 30 | 7.9 1-aminoanthraquinone, 5-aminoanthrapyrimidine. | Red brown | Brown. |

We claim:
1. A dye of the formula:

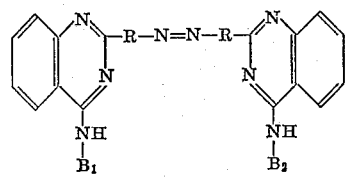

where R is selected from the group consisting of 1,4-phenylene, 1,3-phenylene and 4,4'-diphenylene and $B_1$ and $B_2$ are selected from the group consisting of anthraquinonyl-(1), anthraquinonyl-(2), 3-chloranthraquinonyl-(1), 4-benzoylanthraquinonyl-(1), 5-benzoylanthraquinonyl-(1), 1 - amino - 2 - acetyl - anthraquinonyl-(4), anthraquinon(1(N) - 2 - benzacridone) - yl - (4), 1'-chloro - anthraquinone - 1(N) - 2 - benzacridonyl - (4'), 1 - amino - 2 - [2 - phenyloxdiazolyl - (5)] - anthraquinonyl - (4), 1 - amino - 2 - [(2-phenylene)-oxdiazolyl-(5)]-anthraquinone, anthrapyrimidinyl-(4) and anthrapyrimidinyl-(5).

2. The dye of the formula:
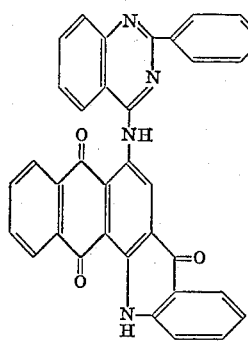
3. The dye of the formula:
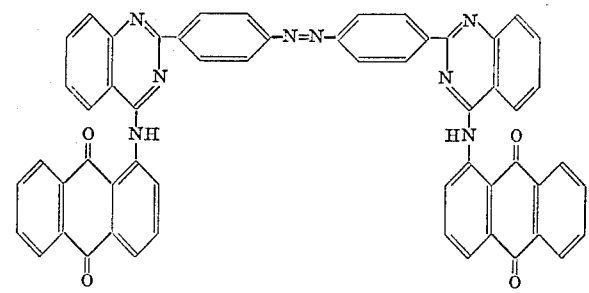
4. The dye of the formula:
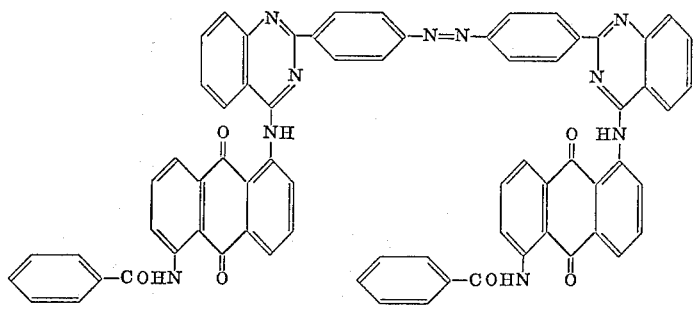
No references cited.

UNITED STATES PATENT OFFICE
CERTIFICATE OF CORRECTION

Patent No. 3,157,631                                        November 17, 1964

Hans Weidinger et al.

It is hereby certified that error appears in the above numbered patent requiring correction and that the said Letters Patent should read as corrected below.

Column 3, Table 1, under the heading "Parts of vattable amine", and opposite Example No. 4, for "-bensoylamino-" read -- -benzoylamino- --; same Table 1, under the same heading, and opposite Example No. 6, and Example No. 8, for "oxadiazoyl", each occurrence, read -- oxadiazolyl --; column 5, Table 3, under the heading "Parts of vattable amine", and opposite Example 21, for "(97.8)" read -- (97.8%) --; column 6, Table 4, under the heading "Parts of vattable amine", and opposite Example No. 26, for "5-aminoantherapyrimidine" read -- 5-aminoanthrapyrimidine --.

Signed and sealed this 18th day of May 1965.

(SEAL)
Attest:

ERNEST W. SWIDER                            EDWARD J. BRENNER
Attesting Officer                            Commissioner of Patents